United States Patent
Weinkötz et al.

(10) Patent No.: US 10,661,472 B2
(45) Date of Patent: *May 26, 2020

(54) METHOD FOR PRODUCING MULTI-LAYERED LIGNOCELLULOSE MATERIALS HAVING A CORE WITH SPECIAL PROPERTIES AND AT LEAST ONE UPPER AND ONE LOWER COVER LAYER

(71) Applicant: BASF SE, Ludwigshafen (DE)

(72) Inventors: Stephan Weinkötz, Neustadt (DE); Ingolf Hennig, Neulußheim (DE); Matthias Schade, Limburgerhof (DE); Detlef Krug, Dresden (DE); Marco Mäbert, Klipphausen (DE)

(73) Assignee: BASF SE (DE)

( * ) Notice: Subject to any disclaimer, the term of this patent is extended or adjusted under 35 U.S.C. 154(b) by 26 days.

This patent is subject to a terminal disclaimer.

(21) Appl. No.: 15/534,223

(22) PCT Filed: Dec. 7, 2015

(86) PCT No.: PCT/EP2015/078810
§ 371 (c)(1),
(2) Date: Jun. 8, 2017

(87) PCT Pub. No.: WO2016/091797
PCT Pub. Date: Jun. 16, 2016

(65) Prior Publication Data
US 2017/0361489 A1    Dec. 21, 2017

(30) Foreign Application Priority Data

Dec. 9, 2014 (EP) .................................. 14197059

(51) Int. Cl.
| | | |
|---|---|---|
| B27N 3/02 | (2006.01) | |
| B27N 3/00 | (2006.01) | |
| B27N 3/24 | (2006.01) | |
| B27N 3/18 | (2006.01) | |
| B27N 3/06 | (2006.01) | |
| B32B 5/14 | (2006.01) | |

(52) U.S. Cl.
CPC .............. *B27N 3/02* (2013.01); *B27N 3/002* (2013.01); *B27N 3/005* (2013.01); *B27N 3/18* (2013.01); *B27N 3/24* (2013.01); *B27N 3/06* (2013.01); *B32B 5/145* (2013.01); *B32B 2250/40* (2013.01); *B32B 2262/065* (2013.01)

(58) Field of Classification Search
CPC .. B27N 3/02; B27N 3/002; B27N 3/06; B32B 2262/065; B32B 2307/722; B32B 5/145; B32B 2250/40
See application file for complete search history.

(56) References Cited

U.S. PATENT DOCUMENTS

| | | | |
|---|---|---|---|
| 3,649,396 A | 3/1972 | Carlsson | |
| 3,905,847 A * | 9/1975 | Black | B27N 3/002 |
| | | | 156/62.2 |
| 3,933,875 A | 1/1976 | Brose et al. | |
| 4,420,357 A | 12/1983 | Neubauer et al. | |
| 5,112,875 A | 5/1992 | Zimmermann et al. | |
| 5,913,990 A | 6/1999 | Kramer | |
| 2011/0217550 A1* | 9/2011 | Peretolchin | B32B 5/16 |
| | | | 428/402 |
| 2012/0141772 A1* | 6/2012 | Braun | B27N 3/005 |
| | | | 428/313.5 |

(Continued)

FOREIGN PATENT DOCUMENTS

| | | |
|---|---|---|
| CA | 2821159 A1 | 6/2012 |
| CA | 2854701 A1 | 6/2013 |

(Continued)

OTHER PUBLICATIONS

International Preliminary Examination Report (in German) for PCT/EP2015/078810 dated Nov. 9, 2016.
International Preliminary Examination Report with Applicant Amended Claims (in German) for PCT/EP2015/079050 dated Nov. 11, 2016.
International Search Report for PCT/EP2015/078810 dated Mar. 15, 2016.
International Search Report for PCT/EP2015/079050 dated Mar. 16, 2016.

(Continued)

*Primary Examiner* — Scott R. Walshon
*Assistant Examiner* — Jasper Saberi
(74) *Attorney, Agent, or Firm* — Faegre Drinker Biddle & Reath LLP

(57) ABSTRACT

The invention relates to a method for producing multi-layered lignocellulose materials having a core and an upper and a lower cover layer, said method comprising the following steps a) mixing the components, b) spreading the mixtures in layers, c) pre-compressing, d) applying a high-frequency electric field e) hot pressing. According to the invention, a mixture of C) 1-15 wt.-% of a binding agent selected from the group consisting of aminoplastic resin and organic isocyanate having at least two isocyanate groups [components C)], F) 0.1-3% alkali-/akaline earth salts, for the cover layers of the lignocellulose particles G) with H) 1-15% of a binding agent selected from the group consisting of aminoplastic resin and an organic isocyanate is mixed. After step a) the mixture for the core contains, with respect to the total dry weight of the mixture of the components A)-F) 3-15% water, the mixture for the cover layers of the components G)-K) contains 5-20% water, and the following conditions are met: F)≥1,1•components K) and [components F)+components D)]≥1,1•[components K)+components I)].

11 Claims, No Drawings

(56) References Cited

U.S. PATENT DOCUMENTS

| | | | |
|---|---|---|---|
| 2012/0219815 A1* | 8/2012 | Schmidt | B27N 3/005 |
| | | | 428/528 |
| 2015/0017425 A1 | 1/2015 | Schade et al. | |
| 2015/0045500 A1 | 2/2015 | Finkenauer et al. | |
| 2016/0046780 A1 | 2/2016 | Schade et al. | |
| 2016/0051112 A1 | 2/2016 | Schade et al. | |
| 2016/0257814 A1 | 9/2016 | Schade et al. | |
| 2017/0021525 A1 | 1/2017 | Weinkotz | |

FOREIGN PATENT DOCUMENTS

| | | |
|---|---|---|
| CH | 583273 A5 | 12/1976 |
| DE | 3107592 A1 | 9/1982 |
| DE | 2908470 C2 | 9/1983 |
| DE | 3107589 C2 | 1/1986 |
| DE | 4412515 A1 | 10/1995 |
| DE | 10315922 A1 | 11/2004 |
| DE | 102006028392 A1 | 12/2007 |
| EP | 2699396 A1 | 2/2014 |
| WO | WO-9201540 A1 | 2/1992 |
| WO | WO-9728936 A1 | 8/1997 |
| WO | WO-2009080748 A1 | 7/2009 |
| WO | WO-2012080338 A1 | 6/2012 |
| WO | WO-2012143907 A1 | 10/2012 |
| WO | WO-2013092817 A1 | 6/2013 |

OTHER PUBLICATIONS

Pereira, C., et al., "High Frequency Heating of Medium Density Fiberboard (MDF): Theory and Experiment", Chemical Engineering Science, 2004, vol. 59, Issue 4, pp. 735-745.

* cited by examiner

METHOD FOR PRODUCING MULTI-LAYERED LIGNOCELLULOSE MATERIALS HAVING A CORE WITH SPECIAL PROPERTIES AND AT LEAST ONE UPPER AND ONE LOWER COVER LAYER

CROSS-REFERENCE TO RELATED APPLICATIONS

This application is a national stage application (under 35 U.S.C. § 371) of PCT/EP2015/078810 filed Dec. 7, 2015, which claims benefit of European Application No. 14197059.0, filed Dec. 9, 2014, both of which are incorporated herein by reference in their entirety.

The present invention relates to a process for the production of multilayer lignocellulose materials with a core and with at least one upper and one lower outer layer, and with specific properties of the core.

WO-A-97/28936 discloses that lignocellulose-containing particles are scattered to give a mat which is then precompacted, heated during precompaction by means of high-frequency energy and finally, in a hot press, pressed to give a sheet. This process has the disadvantage that there is no possibility of establishing temperature differences between exterior and interior layers in a controlled manner.

U.S. Pat. No. 3,649,396 discloses a process for the production of particle board by scattering the glue-treated particles in three layers in a manner such that the temperature of the interior layer is higher than that of the two exterior layers. This is achieved by heating of the material to be scattered for the interior layer to up to 75° C. after glue-treatment and before scattering.

DE-A-44 12 515 discloses a process for the production of single- or multilayer wooden boards by using high frequency or microwave to heat the starting material mixed with binder, before scattering. In the case of three-layer boards, only the material of the middle layer can be heated.

DE-C-29 08 470 discloses a device for the batchwise production of particle board or fiberboard which has high-frequency heating installed in a manner such that before scattering of the mat is complete (only the lower outer layer and the middle layer having been scattered at the juncture of energy introduction) said mat is heated during the return procedure of the scattering unit during the pressing of a preceding nonwoven section. The energy here is mainly introduced into the middle layer. The upper outer layer is then scattered thereover. The lower outer layer here serves as insulation.

All of these processes have technical disadvantages.

The following has accordingly been found:

A new and improved process for the batchwise or continuous, preferably continuous production of multilayer lignocellulose materials with a core and with at least one upper and one lower outer layer, comprising the following steps:

a) mixing of the components of the individual layers separately from one another, b) layer-by-layer scattering of the mixtures (for the core layer and for the outer layers) to give a mat, c) precompaction after the scattering of the individual layers, d) application of a high-frequency electrical field before, during and/or after the precompaction, and then e) hot pressing, where, in step a), for the core, the lignocellulose particles A) [component A)] are mixed with B) from 0 to 25% by weight of expanded plastics particles with bulk density in the range from 10 to 150 kg/m$^3$ [component B)], C) from 1 to 15% by weight of one or more binders selected from the group consisting of aminoplastic resin and organic isocyanate having at least two isocyanate groups [component C)], D) from 0 to 3% by weight of ammonium salts [component D)], E) from 0 to 5% by weight of additives [component E)] and F) from 0.1 to 3% by weight of alkali metal salts or alkaline earth metal salts from the group of the sulfates, nitrates, halides and mixtures of these [component F)], and for the outer layers, the lignocellulose particles G) [component G)] are mixed with H) from 1 to 15% by weight of one or more binders selected from the group consisting of aminoplastic resin and organic isocyanate having at least two isocyanate groups [component H)], I) from 0 to 2% by weight of ammonium salts [component I)], J) from 0 to 5% by weight of additives [component J)] and K) from 0 to 2% by weight of alkali metal salts or alkaline earth metal salts from the group of the sulfates, nitrates, halides and mixtures of these [component K)], wherein, after step a), the mixture for the core comprises, based on the total dry weight of the mixture of components A) to F) from 3 to 15% by weight of water, the mixture(s) for the outer layers comprise(s), based on the total dry weight of the mixture(s) of components G) to K), from 5 to 20% by weight of water, and the following conditions are met:

component F)≥1.1•component K) and
[component F)+component D)]≥1.1•[component K)+component I)], multilayer lignocellulose materials produced by a process for the batchwise or continuous, preferably continuous production of multilayer lignocellulose materials with a core and with at least one upper and one layer outer layer, comprising the following steps:

a) mixing of the components of the individual layers separately from one another, b) layer-by-layer scattering of the mixtures (for the core layer and for the outer layers) to give a mat, c) precompaction after the scattering of the individual layers, d) application of a high-frequency electrical field before, during and/or after the precompaction, and then e) hot pressing, where, in step a), for the core, the lignocellulose particles A) [component A)] are mixed with B) from 0 to 25% by weight of expanded plastics particles with bulk density in the range from 10 to 150 kg/m$^3$ [component B)], C) from 1 to 15% by weight of one or more binders selected from the group consisting of aminoplastic resin and organic isocyanate having at least two isocyanate groups [component C)], D) from 0 to 3% by weight of ammonium salts [component D)], E) from 0 to 5% by weight of additives [component E)] and F) from 0.1 to 3% by weight of alkali metal salts or alkaline earth metal salts from the group of the sulfates, nitrates, halides and mixtures of these [component F)], and for the outer layers, the lignocellulose particles G) [component G)] are mixed with H) from 1 to 15% by weight of one or more binders selected from the group consisting of aminoplastic resin and organic isocyanate having at least two isocyanate groups [component H)], I) from 0 to 2% by weight of ammonium salts [component I)], J) from 0 to 5% by weight of additives [component J)] and K) from 0 to 2% by weight of alkali metal salts or alkaline earth metal salts from the group of the sulfates, nitrates, halides and mixtures of these [component K)], wherein, after step a), the mixture for the core comprises, based on the total dry weight of the mixture of components A) to F) from 3 to 15% by weight of water, the mixture(s) for the outer layers comprise(s), based on the total dry weight of the mixture(s) of components G) to K), from 5 to 20% by weight of water, and the following conditions are met:

component F)≥1.1•component K) and
[component F)+component D)]≥1.1•[component K)+component I)], and also multilayer lignocellulose materials with a core and with at least one upper and one lower outer layer, where the core comprises, based on the lignocellulose particles A) [component A)], the following components:

B) from 0 to 25% by weight of expanded plastics particles with bulk density in the range from 10 to 150 kg/m$^3$ [component B)], C) from 1 to 15% by weight of one or more binders selected from the group consisting of aminoplastic resin and organic isocyanate having at least two isocyanate groups [component C)], D) from 0 to 3% by weight of ammonium salts [component D)], E) from 0 to 5% by weight of additives [component E)] and F) from 0.1 to 3% by weight of alkali metal salts or alkaline earth metal salts from the group of the sulfates, nitrates, halides and mixtures of these [component F)], and where the outer layers comprise, based on the lignocellulose particles G) [component G)], the following components:

H) from 1 to 15% by weight of one or more binders selected from the group consisting of aminoplastic resin and organic isocyanate having at least two isocyanate groups [component H)], I) from 0 to 2% by weight of ammonium salts [component I)], J) from 0 to 5% by weight of additives [component J)] and K) from 0 to 2% by weight of alkali metal salts or alkaline earth metal salts from the group of the sulfates, nitrates, halides and mixtures of these [component K)], and the following conditions are met:

component F)≥1.1•component K) and
[component F)+component D)]≥1.1•[component K)+component I)].

The data relating to the % by weight values for components B) to F) are the weights of the respective components based on the dry weight of the lignocellulose particles A) [component A)]. The data relating to the % by weight values for components H) to K) are the weights of the respective components based on the dry weight of the lignocellulose particles G) [component G)].

In this invention, the dry weight of the lignocellulose particles A) [component A)] and, respectively, of the lignocellulose particles G) means the weight of the lignocellulose particles without the water comprised therein. Another term used for this is absolute dry weight. The weight data for components B) to F), and also for components H) to K), relate to the weight of the respective component without water. If the components are used in aqueous form, i.e. by way of example in the form of aqueous solutions or emulsions, the water is then ignored in the weight data. If by way of example 5 kg of 30% ammonium nitrate solution are used as component I) per 100 kg of lignocellulose particles G) (dry weight), the resultant quantity of ammonium nitrate is 1.5% by weight. In the case of amino plastic resins, the weight is based on solids content. The solids content of amino plastic resins is determined by weighing 1 g of the resin into a weighing dish, drying for 2 hours at 120° C.+/−2° C. in a drying oven and weighing the residue after cooling to room temperature in a desiccator (Zeppenfeld, Grunwald, Klebstoffe in der Holz-und Möbelindustrie [Adhesives in the wood and furniture industry], DRW Verlag, 2$^{nd}$ edn., 2005, p. 286).

All layers additionally comprise water which is ignored in the weight data for components A) to K).

The water can derive from the residual moisture comprised in the lignocellulose particles A) and, respectively, G), from the binders C) and, respectively, H), for example if the isocyanate-containing binder takes the form of aqueous emulsion or if aqueous aminoplastic resins are used, from water that is added, for example in order to dilute the binders or in order to moisten the outer layers, from the additives E) and, respectively, J), for example aqueous paraffin emulsions, from the ammonium salts D) and, respectively I), for example aqueous ammonium salt solutions, or from the expanded plastics particles B) if by way of example steam is used to foam these. It is also possible that water is added independently of the components, e.g. via admixture of water, or spray-application of water. After step a), the water content of the mixture for the core is from 3 to 15% by weight, preferably from 3.5 to 12% by weight, particularly preferably from 4 to 10% by weight, very particularly preferably from 5 to 9% by weight, based on the total dry weight of the mixture of components A) to F). After step a), the water content of the mixture(s) for the outer layers is from 5 to 20% by weight, preferably from 6 to 16% by weight, particularly preferably from 7 to 14% by weight, very particularly preferably from 8 to 13% by weight, based on the total dry weight of the mixture(s) of components G) to K). The water content of the mixtures is determined after step a) by the Darr method (A. Wagenführ, F. Scholz, Taschenbuch der Holztechnik [Wood technology handbook], 2$^{nd}$ edn., 2012, Carl Hanser Verlag, p. 84). For this, a sample of the respective mixture is weighed in moist condition ($m_f$=mass, moist) and in Darr-dried condition ($m_d$=mass, Darr-dried). The Darr mass is determined by drying at 103° C. to constant mass. The sample is then cooled in a desiccator, and mass is determined in the Darr-dried condition. Water content is calculated as follows:

$$\text{water content [in \% by weight]} = [(m_f - m_d)/m_d] \cdot 100\%.$$

Water content in the mixture(s) for the outer layers is preferably greater than or equal to that in the core. The extent to which water content [in % by weight] in the mixture(s) for the outer layers is greater than that in the core is particularly preferably from 0.5 to 4% by weight, very particularly preferably from 2 to 4% by weight.

The structure of the multilayer lignocellulose materials is as follows:
(1) outer layer (DS-A), the upper outer layer,
(2) core (core-B) and
(3) outer layer (DS-C), the lower outer layer,
where the outer layers DS-A and DS-C respectively can be composed of one or more, i.e. from 1 to 5, preferably from 1 to 3, particularly preferably from 1 to 2, layers of different compositions and the compositions of outer layers DS-A and DS-C are identical or different, preferably identical. In particular, the structure of the multilayer lignocellulose materials is composed of a core and of an upper and a lower outer layer.

The lignocellulose material can comprise, in addition to the outer layers, further exterior "protective layers", preferably two further exterior layers, i.e. an upper protective layer adjoining the outer layer DS-A (in the case of one layer) or adjoining the uppermost of the upper outer layers DS-A (in the case of a plurality of layers), and a lower protective layer adjoining the outer layer DS-C (in the case of one layer) or adjoining the undermost of the lower outer layers DS-C (in the case of a plurality of layers), where these respectively have any desired composition. These protective layers are markedly thinner than the outer layers. The ratio by mass of protective layers to outer layers is less than 10:90, preferably less than 5:95. It is very particularly preferable that no protective layers are present.

The following conditions apply to the process of the invention for the production of the lignocellulose materials (after step a)):

Condition 1

The proportion of component F) based on the dry weight of the lignocellulose particles A) in the mixture of components A) to F) is higher by at least a factor of 1.1 than the proportion of component K) based on the dry weight of the lignocellulose particles G) in the mixture of components G) to K), i.e. component F)≥1.1•component K). If the proportion of component K) in the mixture of components G) to K) is by way of example 1% by weight, the proportion of component F) in the mixture of components A) to F) is then therefore at least 1.1% by weight. The factor by which the proportion of component F) based on the dry weight of lignocellulose particles A) in the mixture of components A) to F) is higher than the proportion of K) based on the dry weight of the lignocellulose particles G) in the mixture of components G) to K) is preferably at least 1.5 times, (i.e. component F)≥1.5•component K)), particularly preferably at least 3 times (i.e. component F)≥3•component K)), very particularly preferably at least 10 times (i.e. component F)≥10•component K)). In a very particularly preferred embodiment, no component K) is added to the mixture of the components G) to J).

Condition 2

The sum of the proportion of component F) and the proportion of component D) based in each case on the dry weight of the lignocellulose cellulose A) in the mixture of components A) to F) is higher by at least a factor of 1.1 than the sum of the proportion of component K) and the proportion of component I) based in each case on the dry weight of the lignocellulose particles G) in the mixture of components G) to K), i.e. [component F)+component D)]≥1.1•[component K)+component I)]). If the proportion of component K) in the mixture of components G) to K) is by way of example 0.5% by weight and the proportion of component I) is 1.5% by weight, the sum of the proportion of component F) and the proportion of component D) in the mixture of components A) to D) must then therefore be at least 1.1•2% by weight=2.2% by weight (i.e. by way of example proportion of component F)=0.7% by weight and proportion of component D)=1.5% by weight). The factor by which the sum of the proportion of component F) and the proportion of component D) based in each case on the dry weight of the lignocellulose particles A) in the mixture of components A) to F) is higher than the sum of the proportion of component K) and the proportion of component I)—based in each case on the dry weight of the lignocellulose particles G)—in the mixture of components G) to K) is preferably at least 1.5 times (i.e. [component F)+component D)]≥1.5•[component K)+component I)]), particularly preferably at least 3 times (i.e. [component F)+component D)]≥3•[component K)+component I)]), very particularly preferably at least 5 times (i.e. [component F)+component D)]≥5•[component K)+component I)]).

As a general rule in the process of the invention, dielectric loss (dielectric absorption) after step b) not only of the upper outer layer(s) but also of the lower outer layer(s), respectively mutually independently, is lower than the dielectric loss in the layer of the core by at least 10%, i.e. from 10 to 90%, preferably by at least 15%, i.e. from 15 to 80%, particularly preferably by at least 20%, i.e. from 20 to 70%, in particular by at least 25%, i.e. from 25 to 60%.

Dielectric loss for each individual layer of the lignocellulose-containing materials can be determined individually.

The dielectrical displacement field is given by $D(\omega)=\omega^*(\omega)E(\omega)$, where $E(\omega)$ is the electrical field of the frequency $\omega$ and $\varepsilon^*(\omega)$ is the complex dielectric constant at the frequency $\omega$. $\varepsilon^*(\omega)$ is a complex variable, and is composed of the factors $\varepsilon_0$ (permativity of vacuum) and $\varepsilon_r^*$ (relative permativity), i.e. $\varepsilon^*(\omega)=\varepsilon_0\varepsilon_r^*$. Complex relative permativity can be described via a real component and an imaginary component: $\varepsilon_r^*=\varepsilon'-i\varepsilon''$, where the dielectric losses, i.e. the conversion of electrical energy into thermal energy, are included by way of the imaginary component $\varepsilon''$. $\varepsilon''$ is also termed dielectric loss. The loss-power density p for dielectric heating, based on the volume of material, is $$p=\omega\cdot\varepsilon''\cdot\varepsilon_0\cdot E^2$$

By determining the dielectric loss of a mixture of materials it is therefore possible to determine what proportion of the electrical energy of the alternating field applied is converted into thermal energy.

The dielectric loss of the mixtures A) to F) and G) to K) can be determined by using a measurement chamber composed of an exterior and interior metal cylinder. The structure corresponds to that of a cylindrical capacitor where the basal surfaces of the exterior and the interior cylinder lie in the same plane and the two cylindrical surfaces (internal side of the exterior cylinder and external side of the interior cylinder) are coaxial. The mixture to be tested is charged to the annular intervening space between the exterior (diameter 9.5 cm) and interior (diameter 5 cm) metal cylinder. The material is charged to a height of 11.9 cm. An alternating electrical field is applied to the cylindrical capacitor and the dielectric response is determined by measuring the current flowing through the mixture of materials. An LCR meter or an impedance analyzer can be used for the measurement. The constituents of the dielectric loss are as follows: $\varepsilon''=\varepsilon''_{dip}+\varepsilon''_{LF}$, where $\varepsilon''_{dip}$ is the dipolar contribution and $\varepsilon''_{LF}$ is the conductivity contribution.

The dielectric loss is determined at the frequency that is used for the heating in step d), either by direct determination at this frequency or by using conventional extrapolation methods to determine the value.

The process of the invention can be carried out as follows:

Step a)

Components A), B), C), D), E) and F) (composition of the core) and components G), H), I), J) and K) (composition of the outer layers) are generally mixed in separate mixing procedures, where the respective general procedure is that the lignocellulose particles [component A) and, respectively, component G)] are first charged and the remaining components B), C), D), E) and F) and, respectively, H), I), J) and K) are added in any desired sequence. In a preferred embodiment, component B) is first added to component A), and then components C), D), E) and F) are added in any desired sequence. It is also possible to premix components separately before they are added. By way of example, it is possible that component A) is first charged and optionally mixed with component B), and that a mixture of components C), D), E) and F), or a mixture of C) and D) is then added, followed by a mixture of E) and F).

Step b)

The resultant mixture of components A), B), C), D), E) and F) and the mixture(s) of components G), H), I), J) and K) are scattered onto one another to give a mat, thus giving the structure of the invention comprising the multilayer lignocellulose materials [according to the sequence (1), (2), (3)]. This is generally achieved by scattering the mixtures directly by way of example onto a shaping belt.

The general procedure here is that the lower outer layers are scattered, beginning with the outermost outer layer and continuing as far as the lower outer layer closest to the core, these being followed by the core layer and then the upper outer layers, beginning with the upper layer closest to the core and continuing as far as the outermost outer layer, preference being given to scattering of one lower outer layer, this being followed by the core layer and then the upper outer layer.

The total quantity used of the two mixtures is determined via the target density, the target thickness and the target format of the lignocellulose material to be produced. The ratio of the total mass of the scattered quantity of the mixture of components A), B), C), D), E) and F) for the core to the total mass of the scattered quantity of the mixture(s) of components G), H), I), J) and K) for the outer layers is generally from 100:1 to 0.25:1, preferably from 10:1 to 0.5:1, particularly preferably from 6:1 to 0.75:1, in particular from 4:1 to 1:1

Scattering can be carried out by methods known per se, for example mechanical scattering, or pneumatic scattering, or by way of example with roller systems (see by way of example M. Dunky, P. Niemz, Holzwerkstoffe and Leime [Wood materials and glues], pp. 119-121, Springer Verlag Heidelberg, 2002), batchwise or continuously, preferably continuously.

Step c)

After the scattering of each individual layer, precompaction can take place; it is preferable that the precompaction is carried out after scattering of all of the layers onto one another.

The precompaction can generally be carried out before, during and/or after step d).

The heating in step d) to elevated temperature generally takes place during or after precompaction, preferably after precompaction.

Precompaction can take place in one, two or more steps. Available options here are heating by application of a high-frequency electrical field (step d)) before the first of these steps, between these steps, after the last of these steps or during one, two or more of these steps. In a preferred embodiment, the scattered mat is precompacted and then heated by application of a high-frequency electrical field, and it is optionally possible during said heating to carry out a further precompaction step. Alternatively, an additional further precompaction step can take place, i.e. the scattered mat is precompacted, then the high-frequency electrical field is applied and at the same time a further precompaction step is optionally carried out, and finally then after the high-frequency electrical field has been switched off a further precompaction step is carried out.

The precompaction generally takes place at a pressure of from 1 to 30 bar, preferably from 2 to 25 bar, particularly preferably from 3 to 20 bar. The precompaction, or the precompaction steps, lead(s) to a mat with depth at the juncture Z of from 20 to 80%, preferably from 25 to 70%, particularly preferably from 27.5 to 60%, very particularly from 30 to 50%, of the depth of the mat immediately after scattering of the mat. Juncture Z here means either, in the event that the precompaction takes place exclusively before and/or during the step d), the juncture at which the heating in the applied high-frequency electrical field has concluded or, in the event that the final precompaction step takes place after the step d), the juncture at which the final precompaction step has concluded.

In a particular embodiment, the upper or lower, or preferably both the upper and the lower, outer layer, where these form the interfaces with the environment, is/are treated before, during or after precompaction, with from 1 to 100 g/m$^2$, preferably from 5 to 80 g/m$^2$, particularly preferably from 15 to 60 g/m$^2$, of water or of an aqueous solution, emulsion or suspension of an additive. Additives that can be used here are release agents, surfactants or formaldehyde scavengers, for example urea or polyamines. The concentration of additive is from 0 to 65% by weight, preferably from 0 to 50% by weight. It is particularly preferable to use water (0% by weight of additives).

a. Application to the lower side of the mat takes place by way of example in that, before scattering, water or aqueous solution, emulsion or suspension of an additive is applied to the shaping belt, and b. application to the upper side takes place by way of example via dropwise application, roll-application, coat application or spray-application, preferably via spray-application, after scattering of all of the layers, before the first precompaction step or after one of the precompaction steps, i.e. generally outside of the precompaction procedure. Application to the upper side particularly preferably takes place before the first, or after the last, precompaction step, and very particularly preferably takes place before the first precompaction step.

Step d)

The energy for the heating of the mat is introduced by applying a high-frequency electrical field. The core B of the mat is heated here to a greater extent than the outer layers DS-A and DS-C. This is achieved in that, as described at a later stage below, certain quantities and quantitative proportions of components D), F), I) and K) are used in the outer layers and in the core.

The high-frequency electrical field applied can be microwave radiation or a high-frequency electrical field which arises between the two capacitor plates when a high-frequency alternating-voltage field has been applied to a plate capacitor.

Suitable frequencies for the high-frequency electromagnetic fields are from 100 kHz to 30 GHz, preferably from 6 MHz to 3 GHz, particularly from 13 MHz to 41 MHz, in particular the respective nationally or internationally available frequencies such as 13.56 MHz, 27.12 MHz, 40.68 MHz, 2.45 GHz, 5.80 GHz, 24.12 GHz, and particularly preferably 13.56 and 27.12 MHz.

The electrical power required in the process of the invention is generally from 10 to 10 000 kWh, preferably from 100 to 5000 kWh, particularly preferably from 500 to 2000 kWh.

The electrical field strength required in the process of the invention is generally from 0.1 to 10 000 V/mm, preferably from 1 to 2000 V/mm, particularly preferably from 10 to 500 V/mm.

In a particularly preferred embodiment, a precompaction step can first be carried out, and can be followed by heating via application of a high-frequency high-voltage field. This procedure can take place either continuously or batchwise, preferably continuously.

To this end, the scattered and precompacted mat can be passed by means of a conveyor belt through a region between plate capacitors in parallel arrangement. The average residence time for which the high-frequency electrical field acts on the mat, per mm of mat thickness at the juncture of application of the electrical field, is generally from 0.1 to 100 seconds, preferably from 0.1 to 5 seconds, particularly preferably from 0.2 to 3 seconds, in particular from 0.3 to 2 seconds.

A device for a continuous process for realizing the heating via application of a high-frequency electrical field after precompaction within the same machine is described by way of example in WO-A-97/28936.

The heating immediately after the precompaction step can also take place in a high-frequency press operating batchwise, e.g. in a high-frequency press such as the HLOP 170 press from Hoefer Presstechnik GmbH.

In a particular embodiment, introduction of heat to achieve this temperature takes place within a period of 60 seconds, preferably 40 seconds, particularly preferably 20 seconds, very particularly preferably 10 seconds.

If the heating takes place after precompaction, expansion of the mat during heating can be suppressed, minimized or prevented by carrying out the heating in a space which has restricted depth and height. The design of the restriction surfaces here is such that energy can be introduced. The design of the restriction surfaces is optionally such that they exert, onto the mat, a pressure sufficiently great to prevent expansion during heating.

In a particular embodiment of a continuous process, these restriction surfaces are press belts which are driven by rollers. The plates of the capacitors are arranged behind these press belts. The mat here is passed through a pair of capacitor plates, one of the press belts here being between mat and upper capacitor plate and the other press belt here being between mat and lower capacitor plate. One of the two capacitor plates can be grounded; the high-frequency heating then operates with asymmetric feed.

The temperature in the core-B after step d) is generally at least 60° C., preferably at least 70° C., particularly preferably at least 90° C., very particularly preferably at least 100° C., and at most 150° C., preferably at most 140° C. and particularly preferably at most 135° C. and very particularly preferably 130° C. The temperature range is generally from 60 to 150° C., preferably from 70 to 140° C., particularly preferably from 90 to 135° C., in particular from 100 to 130° C.

The temperature difference between the core-B and the cooler outer layers DS-A and DS-C after step d) is generally at least 5° C., preferably at least 10° C., particularly preferably at least 15° C., very particularly preferably at least 20° C., and at most 50° C., preferably at most 45° C. and particularly preferably at most 40° C. The temperature range of the difference is generally from 5 to 50° C., preferably from 10 to 45° C., particularly preferably from 15 to 40° C., in particular from 20 to 40° C.

The temperature data are based on measurements made immediately after the step d). The temperature of the core-B and of the outer layers DS-A and DS-C here means respectively the temperature in the middle of the respective layer. The measurement is therefore made in the plane of the core-B (and, respectively, of the outer layer(s) DS-A and, respectively, the outer layer(s) DS-C), wherein said plane is parallel to the surfaces of the mat and that above said plane and below said plane respectively the same volume of mixtures A) to F) (and, respectively, G) to K)) is present within the respective layer.

This measurement can be made as follows:

Immediately after the step b), a temperature-measurement sensor is introduced into each layer of the mat in such a way that the tip of the measurement sensor is in each case in the middle of the layers. The measurement sensors are advantageously introduced parallel to the planes described in the preceding paragraph. By way of example in the case of a three-layer mat composed of an upper outer layer DS-A, of a core-B and of a lower outer layer DS-C (which corresponds to the outer layer DS-A in terms of composition and quantity) and where after step b) the thickness of the outer layers DS-A and DS-C is by way of example 4 mm and the thickness of the core-B is 10 mm, a temperature sensor is introduced at a height of 2 mm (calculated from the base of the mat) for the temperature of DS-C, a temperature sensor is introduced at a height of 9 mm for the temperature of the core-B and a temperature sensor is introduced at a height of 16 mm for the temperature of the outer layer DS-A.

After the step d), a further precompaction step can take place. It is preferable that no further precompaction step takes place.

Step e)

The precompacted and preheated mat is usually pressed to the desired thickness and, respectively, into the desired shape by contact with heated press surfaces which have temperatures of from 80 to 300° C., preferably from 120 to 280° C., particularly preferably from 150 to 250° C., and at a pressure of from 1 to 50 bar, preferably from 3 to 40 bar, particularly preferably from 5 to 30 bar, to give lignocellulose materials. Any of the processes known to the person skilled in the art can be used (see examples in "Taschenbuch der Spanplatten Technik" [Handbook of particle board technology] H.-J. Deppe, K. Ernst, 4th edn. 2000, DRW—Verlag Weinbrenner, Leinfelden-Echterdingen, pp. 232-254, and "MDF—Mitteldichte Faserplatten" [MDF—medium-density fiberboard] H.-J. Deppe, K. Ernst, 1996, DRW—Verlag Weinbrenner, Leinfelden-Echterdingen, pp. 93-104). It is preferable to use continuous press processes, for example using twin-belt presses. Press time is normally from 2 to 15 seconds per mm of board thickness, preferably from 2 to 10 seconds per mm of board thickness, particularly preferably from 2 to 6 seconds per mm of board thickness, in particular from 2 to 4 seconds per mm of board thickness, but can also deviate markedly therefrom, and can also be up to a number of minutes, for example up to 5 minutes per mm of board thickness.

In a preferred embodiment, the compaction factor V in the step e), derived from the quotient calculated from $d_v$ and $d_n$ ($V=d_v/d_n$), is from 1.02 to 4, preferably from 1.05 to 2, particularly preferably from 1.1 to 1.5, very particularly preferably from 1.1 to 1.3. $d_v$ here is the thickness of the mat before the step e) and $d_n$ is the thickness of the board after step e).

The components of the mixtures for the core A), B), C), D), E), F) and the components of the mixtures for the outer layers G), H), I), J), K) are defined below.

Components A) and G):

A suitable raw material for the lignocellulose particles A) and G) is any desired type of wood or a mixture of these, for example wood from spruce, beech, pine, larch, lime, poplar, eucalyptus, ash, chestnut or fir or a mixture, preferably wood from spruce or beech or a mixture of these, in particular wood from spruce. It is possible by way of example to use wood entities such as wood plies, wood strands, wood particles, wood fibers, wood dust or a mixture of these, preferably wood particles, wood fibers, wood dust or a mixture of these, particularly preferably wood particles, wood fibers or a mixture of these—as used for the production of particle board, MDF (medium-density fiberboard) and HDF (high-density fiberboard). The lignocellulose particles can also derive from woody plants such as flax, hemp, cereal or other annual plants, preferably from flax or hemp. It is particularly preferable to use wood particles as used in the production of particle board.

Starting materials for the lignocellulose particles are usually roundwood, lumber from forest-thinning, wood residues, waste lumber, industrial wood wastes, used wood, wastes from production of wood-based materials, used wood-based materials, and also lignocellulose-containing plants. Processes known per se can be used for treatment to give the desired lignocellulose-containing particles, for example wood particles or wood fibers (e.g. M. Dunky, P. Niemz, Holzwerkstoffe and Leime [Wood-based materials and glues], pp. 91-156, Springer Verlag Heidelberg, 2002).

The size of the lignocellulose particles can vary within wide limits.

If the lignocellulose particles A) and G) are lignocellulose fibers, the volume-weighted average fiber length of G) of the outer layers is then preferably smaller than or equal to the volume-weighted average fiber length of component A) in the core of the multilayer lignocellulose materials. The ratio of the volume-weighted average fiber lengths ($\bar{x}_{dimension}$) of component G) to the volume-weighted average fiber lengths ($\bar{x}_{dimension}$) of component A) can be varied within wide limits and is generally from 0.1:1 to 1:1, preferably from 0.5:1 to 1:1, particularly preferably from 0.8:1 to 1:1.

The volume-weighted average fiber length ($\bar{x}_{dimension}$) of component A) is generally from 0.1 to 20 mm, preferably from 0.2 to 10 mm, particularly preferably from 0.3 to 8 mm, very particularly preferably from 0.4 to 6 mm.

The volume-weighted average fiber length $\bar{x}_{dimension}$ is determined by means of digital image analysis. An example of equipment that can be used is a Camsizer® from Retsch Technology. The procedure here is that $x_{dimension}$ is determined for each individual fiber of a representative sample. $x_{dimension}$ is calculated from the area of the particle projection A and the Martin diameter $x_{Ma\_min}$. The applicable equation here is $x_{dimension}=x_{Ma\_min}/A$. The volume-weighted average value $\bar{x}_{dimension}$ is calculated from the individual values. The measurement method and the evaluation method are described in the Camsizer manual (Operating instructions/Manual for CAMSIZER® grain-size measurement system, Retsch Technology GmbH, version 0445.506, release 002, revision 009 of 25 Jun. 2010).

If the lignocellulose particles A) and G) are lignocellulose strands or lignocellulose particles, it is then preferable that the volume-weighted average particle diameter of component G) of the outer layers is smaller than or equal to the volume-weighted average particle diameter of component A) in the core of the multilayer lignocellulose materials. The ratio of the volume-weighted average particle diameter $\bar{x}_{Fe\ max}$ of component G) to the volume-weighted average particle diameter $\bar{x}_{Fe\ max}$ of component A) can be varied within wide limits and is generally from 0.01:1 to 1:1, preferably from 0.1:1 to 0.95:1, particularly preferably from 0.5:1 to 0.9:1.

The volume-weighted average particle diameter $\bar{x}_{Fe\ max}$ of component A) is generally from 0.5 to 100 mm, preferably from 1 to 50 mm, particularly preferably from 2 to 30 mm, very particularly preferably from 3 to 20 mm.

The volume-weighted average particle diameter $\bar{x}_{Fe\ max}$ is determined by means of digital image analysis. An example of equipment that can be used is a Camsizer® from Retsch Technology. The procedure here is that $x_{Fe\ max}$ is determined for each individual lignocellulose strand or each individual lignocellulose particle of a representive sample. $X_{Fe\ max}$ is the largest Feret diameter of a particle (determined from various measurement directions). The volume-weighted average value $\bar{x}_{Fe\ max}$ is calculated from the individual values. The measurement method and the evaluation method are described in the Camsizer manual (Operating instructions/Manual for CAMSIZER® grain-size measurement system, Retsch Technology GmbH, version 0445.506, release 002, revision 009 of 25 Jun. 2010).

If mixtures of wood particles and other lignocellulose particles are used, e.g. mixtures of wood particles and wood fibers, or of wood particles and wood dust, the proportion of wood particles in component A) and, respectively, in component G) is generally at least 50% by weight, i.e. from 50 to 100% by weight, preferably at least 75% by weight, i.e. from 75 to 100% by weight, particularly preferably at least 90% by weight, i.e. from 90 to 100% by weight.

The average densities of the lignocellulose particles A) and G) are mutually independently generally from 0.4 to 0.85 g/cm³, preferably from 0.4 to 0.75 g/cm³, in particular from 0.4 to 0.6 g/cm³. These data are based on the standard envelope density after storage under standard conditions of temperature and humidity (20° C., 65% humidity).

The lignocellulose particles A) and G) can mutually independently comprise the usual small quantities of water from 0 to 10% by weight, preferably from 0.5 to 8% by weight, particularly preferably from 1 to 5% by weight (in a conventional small variation range from 0 to 0.5% by weight, preferably from 0 to 0.4% by weight, particularly preferably from 0 to 0.3% by weight). These data are based on 100% by weight of absolutely dry wood substance and describe the water content of the lignocellulose particles A) and, respectively, G) after drying (after application of the Darr method described above) immediately before mixing with the other components.

In another preferred embodiment, the outer layers use lignocellulose fibers as lignocellulose particles G) and the core uses lignocellulose strands or lignocellulose particles, particularly preferably lignocellulose particles, in particular lignocellulose particles with a volume-weighted average particle diameter $\bar{x}_{Fe\,max}$ of from 2 to 30 mm as lignocellulose particles A).

Component B):

Suitable expanded plastics particles of component B) are preferably expanded thermoplastic particles with bulk density from 10 to 150 kg/m$^3$, preferably from 30 to 130 kg/m$^3$, particularly preferably from 35 to 110 kg/m$^3$, in particular from 40 to 100 kg/m$^3$ (determined by weighing of a defined volume filled with the particles).

Expanded plastic particles of component B) are generally used in the form of beads with average diameter from 0.01 to 50 mm, preferably from 0.25 to 10 mm, particularly preferably from 0.4 to 8.5 mm, in particular from 0.4 to 7 mm. In a preferred embodiment, the beads have a small surface area per unit volume, for example taking the form of a spherical or elliptical particle, and are advantageously closed-cell. The open-cell factor in accordance with DIN ISO 4590 is generally not more than 30%, i.e. from 0 to 30%, preferably from 1 to 25%, particularly preferably from 5 to 15%.

Suitable polymers on which the expandable or expanded plastics particles are based are generally of all the known polymers and mixtures of these, preferably thermoplastic polymers and mixtures of these, where these can be foamed. Examples of polymers of this type having good suitability are polyketones, polysulfones, polyoxymethylene, PVC (rigid and flexible), polycarbonates, polyisocyanurates, polycarbodiimides, polyacrylimides and polymethacrylimides, polyamides, polyurethanes, aminoplastic resins and phenolic resins, styrene homopolymers (also termed "polystyrene" or "styrene polymer" below), styrene copolymers, $C_2$- to $C_{10}$-olefin homopolymers, $C_2$- to $C_{10}$-olefin copolymers and polyesters. The olefin polymers mentioned are preferably produced by using 1-alkenes, for example ethylene, propylene, 1-butene, 1-hexene, or 1-octene.

It is moreover possible to add conventional additives to the polymers, preferably the thermoplastics, on which the expandable or expanded plastics particles of component B) are based, examples being UV stabilizers, antioxidants, coating agents, hydrophobizing agents, nucleating agents, plasticizers, flame retardants, and soluble and insoluble inorganic and/or organic dyes.

Component B) can usually be obtained as follows:

If an expandable medium (also termed "blowing agent") is used with suitable polymers, or if suitable polymers comprise an expandable medium, they can be expanded (another term often used being "foamed") via exposure to microwave energy, heat, hot air, or preferably steam, and/or pressure change (Kunststoff Handbuch [Plastics handbook] 1996, vol. 4 "Polystyrol" [Polystyrene], Hanser 1996, pp. 640-673 or U.S. Pat. No. 5,112,875). The general procedure here is that the blowing agent expands and the size of the particles increases, and cell structures arise. This expansion can be carried out in conventional foaming devices, often termed "prefoamers". These prefoamers can be fixed installations or else can be mobile. The expansion can be carried out in one stage or in a plurality of stages. The general procedure in the single-stage process is that the expandable plastics particles are simply expanded to the desired final size. The general procedure in the multistage process is that the expandable plastics particles are first expanded to an intermediate size and then are expanded in one or more further stages by way of an appropriate number of intermediate sizes to the desired final size. In contrast to the expanded plastics particles, the abovementioned plastics particles, also termed "expandable plastics particles" herein, generally comprise no cell structures. The expanded plastics particles generally have only a small content of blowing agent of from 0 to 5% by weight, preferably from 0.5 to 4% by weight, particularly preferably from 1 to 3% by weight, based on the total mass of plastic and blowing agent. The resultant expanded plastics particles can be placed into intermediate storage or can be used for the production of component B of the invention without any further intermediate steps.

Any of the blowing agents known to the person skilled in the art can be used for the expansion of the expandable plastics particles, examples being aliphatic $C_3$- to $C_{10}$-hydrocarbons, for example propane, n-butane, isobutane, n-pentane, isopentane, neopentane, cyclopentane and/or hexane and its isomers, alcohols, ketones, esters, ethers or halogenated hydrocarbons, preferably n-pentane, isopentane, neopentane and cyclopentane, particularly preferably a commercially available pentane isomer mixture made of n-pentane and isopentane.

The content of blowing agent in the expandable plastics particles is generally in the range from 0.01 to 7% by weight, preferably from 0.6 to 5% by weight, particularly preferably from 1.1 to 4% by weight, based in each case on the expandable plastics particles comprising blowing agent.

A preferred embodiment uses styrene homopolymer (also simply called "polystyrene" herein), styrene copolymer or a mixture of these as sole plastic in component B).

This polystyrene and/or styrene copolymer can be produced by any of the polymerization processes known to the person skilled in the art, see by way of example Ullmann's Encyclopedia, sixth edition, 2000 Electronic Release or Kunststoff-Handbuch [Plastics handbook] 1996, vol, 4 "Polystyrol" [Polystyrene], pp. 567-598.

The expandable polystyrene and/or styrene copolymer is generally produced in a manner known per se by suspension polymerization or by means of extrusion processes.

In suspension polymerization, styrene can be polymerized by means of free-radical-forming catalysts, optionally with addition of further comonomers, in aqueous suspension in the presence of a conventional suspension stabilizer. The blowing agent and optionally other conventional additional substances can be concomitantly used as initial charge in the polymerization, or added during the course of the polymerization, or added to the mixture after the polymerization has ended. After polymerization has ended, the resultant expandable styrene polymers in the form of beads impregnated with blowing agent can be separated from the aqueous phase, washed, dried and sieved.

In the case of the extrusion process, the blowing agent can by way of example be mixed into the polymer by way of an extruder, and the material can be conveyed through a die plate and granulated under pressure to give particles or strands.

The preferred or particularly preferred expandable styrene polymers or expandable styrene copolymers described above have relatively low content of blowing agent. They are also termed "low-blowing-agent-content" polymers. U.S. Pat. No. 5,112,875, to which express reference is made herein, describes a process with good suitability for production of low-blowing-agent-content expandable polystyrene or expandable styrene copolymer.

As described, it is also possible to use styrene copolymers. These styrene copolymers advantageously have at least 50% by weight, i.e. from 50 to 100% by weight, preferably at least 80% by weight, i.e. from 80 to 100% by weight, of styrene in the polymer, based on the mass of the plastic (without blowing agent). Examples of comonomers that can be used are α-methylstyrene, ring-halogenated styrenes, acrylonitrile, acrylates or methocrylates of alcohols having from 1 to 8 C atoms, N-vinylcarbazole, maleic acid, maleic anhydride, (meth)acrylamides and/or vinyl acetate.

The polystyrene and/or styrene copolymer can advantageously comprise a small quantity of a chain-branching agent in the polymer, i.e. of a compound having more than one, preferably two, double bonds, for example divinylbenzene, butadiene and/or butanediol diacrylate. Quantities generally used of the branching agent are generally from 0.0005 to 0.5 mol %, based on styrene. It is also possible to use mixtures of various styrene (co)polymers. Styrene homopolymers or styrene copolymers having good suitability are glassclear polystyrene (GPPS), impact-resistant polystyrene (HIPS), anionically polymerized polystyrene and impact-resistant polystyrene (AIPS), styrene-α-methylstyrene copolymers, acrylonitrile-butadiene-styrene polymers (ABS), styrene-acrylonitrile (SAN), acrylonitrile-styrene-acrylate (ASA), methacrylate-butadiene-styrene (MBS), methyl methacrylate-acrylonitrile-butadiene-styrene (MABS) polymers and mixtures thereof and with polyphenylene ether (PPE).

Preference is given to use of plastics particles, particularly preferably styrene polymers or styrene copolymers, in particular styrene homopolymers with molar mass in the range from 70 000 to 400 000 g/mol, particularly preferably from 190 000 to 400 000 g/mol, very particularly preferably from 210 000 to 400 000 g/mol. These expanded polystyrene particles or expanded styrene copolymer particles can be further used for the production of the lignocellulose-containing material with or without further measures to reduce blowing agent content.

The expandable polystyrene or expandable styrene copolymer or the expanded polystyrene or expanded styrene copolymer usually has an antistatic coating.

Even after pressing to give the lignocellulose material, the expanded plastics particles of component B) are generally present in unmelted condition; this means that the plastics particles of component B) have generally not penetrated into the lignocellulose particles or impregnated same, but instead have been distributed between the lignocellulose particles. The plastics particles of component B) can usually be separated from the lignocellulose by physical methods, for example after comminution of the lignocellulose material.

The total quantity of the expanded plastics particles of component B), based on the dry composition of the lignocellulose particles A), is generally in the range from 0 to 25% by weight, preferably from 0 to 20% by weight, particularly preferably from 0 to 10% by weight, in particular 0% by weight.

Components C) and H)

The binders of component C) and, respectively, of component H) can be selected from the group consisting of aminoplastic resin and organic isocyanate having at least two isocyanate groups, where binders or binder mixtures of components C) and, respectively, H) used are preferably identical, particularly preferably in both cases aminoplastic resin. The weight data is based on solids content of the corresponding component (determined by evaporating the water at 120° C. within a period of 2 h by the method of Günter Zeppenfeld, Dirk Grunwald, Klebstoffe in der Holz- und Möbelindustrie [Adhesives in the wood and furniture industry], $2^{nd}$ edn., DRW—Verlag, p. 268) in the case of aminoplastic resins, and the isocyanate component per se, i.e. by way of example without solvent or emulsification medium, in the case of the isocyanate, in particular PMDI (polymeric diphenylmethane diisocyanate).

Aminoplastic resin used can be any of the aminoplastic resins known to the person skilled in the art, preferably those for the production of wood-based materials. These resins, and also production thereof, are described by way of example in Ullmanns Enzyklopädie der technischen Chemie [Ullmann's Encyclopedia of Industrial Chemistry], 4th revised and extended edition, Verlag Chemie, 1973, pp. 403-424 "Aminoplaste" [Aminoplastics] and Ullmann's Encyclopedia of Industrial Chemistry, vol. A2, VCH Verlagsgesellschaft, 1985, pp. 115-141 "Amino Resins" and also in M. Dunky, P. Niemz, Holzwerkstoffe und Leime [Wood-based materials and glues], Springer 2002, pp. 251-259 (UF resins) and pp. 303-313 (MUF and UF with small quantity of melamine). These are generally polycondensates of compounds having at least one carbamide group or amino group, optionally to some extent substituted with organic moieties (another term for the carbamide group being carboxamide group), preferably carbamide group, preferably urea or melamine, and of an aldehyde, preferably formaldehyde. Preferred polycondensates are urea-formaldehyde resins (UF resins), urea-formaldehyde resins (MF resins) and melamine-containing urea-formaldehyde resins (MUF resins), with particular preference urea-formaldehyde resins, for example Kaurit® glue products from BASF SE.

Suitable organic isocyanates are organic isocyanates having at least two isocyanate groups and mixtures of these, in particular any of the organic isocyanates known to the person skilled in the art and mixtures of these, preferably those for the production of wood-based materials or of polyurethanes. These organic isocyanates, and also the production thereof, are described by way of example in Becker/Braun, Kunststoff Handbuch [Plastics handbook], $3^{rd}$ revised edition, vol. 7 "Polyurethane" [Polyurethanes], Hanser 1993, pp. 17-21, pp. 76-88 and pp. 665-671.

Preferred organic isocyanates are oligomeric isocyanates having from 2 to 10, preferably from 2 to 8, monomer units and on average at least one isocyanate group per monomer unit, and mixtures of these. The isocyanates can be either aliphatic, cycloaliphatic or aromatic. Particular preference is given to the organic isocyanate MDI (methylenediphenyl diisocyanate) and the oligomeric organic isocyanate PMDI (polymeric methylenediphenylene diisocyanate), these being obtainable via condensation of formaldehyde with aniline and phosgenation of the isomers and oligomers produced during the condensation (see by way of example Becker/Braun, Kunststoff Handbuch [Plastics handbook], $3^{rd}$ revised edition, vol. 7 "Polyurethane" [Polyurethanes], Hanser 1993, p. 18, final paragraph to p. 19, second paragraph and p. 76, fifth paragraph), and mixtures of MDI and PMDI. Very particular preference is given to products in the LUPRANAT® range from BASF SE, in particular LUPRANAT® M 20 FB from BASF SE.

The organic isocyanate can also be an isocyanate-terminated prepolymer which is the reaction product of an isocyanate, e.g. PMDI, with one or more polyols and/or polyamines.

Polyols selected from the group of ethylene glycol, diethylene glycol, propylene glycol, dipropylene glycol, butanediol, glycerol, trimethylolpropane, triethanolamine, pentaerythritol, sorbitol and mixtures thereof can be used. Other suitable polyols are biopolyols, for example polyols from soy oil, rapeseed oil, castor oil and sunflower oil.

Other suitable materials are polyether polyols which can be obtained via polymerization of cyclic oxides, for example ethylene oxide, propylene oxide, butylene oxide or tetrahydrofuran in the presence of polyfunctional initiators. Suitable initiators comprise active hydrogen atoms and can be water, butanediol, ethylene glycol, propylene glycol, diethylene glycol, triethylene glycol, diproylene glycol, ethanolamine, diethanolamine, triethanolamine, toluenediamine, diethyltoluenediamine, phenyldiamine, diphenylmethanediamine, ethylenediamine, cyclohexanediamine, cyclohexanedimethanol, resorcinol, bisphenol A, glycerol, trimethylolpropane, 1,2,6-hexanetriol, pentaerythritol, and mixtures thereof. Other suitable polyether polyols comprise dials and triols, for example polyoxypropylenediols and -triols and poly(oxyethylene-oxypropylene)diols and -triols, these being produced via simultaneous or successive addition reactions of ethylene oxides and propylene oxides using di- or trifunctional initiators. Other suitable materials are polyester polyols, for example hydroxy-terminated reaction products of polyols of the type already described above with polycarboxylic acids or with polycarboxylic acid derivatives, e.g. anhydrides of these, in particular with dicarboxylic acids or with dicarboxylic acid derivatives, for example succinic acid, dimethyl succinate, glutaric acid, dimethyl glutarate, adipic acid, dimethyl adipate, sebacic acid, phthalic anhydride, tetrachlorophthalic anhydride and dimethyl terephthalate, and mixtures thereof.

It is possible to use polyamines selected from the group of ethylenediamine, toluenediamine, diaminodiphenylmethane, polymethylene polyphenyl polyamines, aminoalcohols and mixtures thereof. Examples of aminoalcohols are ethanolamine and diethanolamine.

The organic isocyanate or the isocyanate-terminated prepolymer can also be used in the form of an aqueous emulsion which is produced by way of example via mixing with water in the presence of an emulsifier. The organic isocyanate or the isocyanate component of the prepolymer can also be a modified isocyanate, examples being carbodiimides, allophanates, isocyanurates and biurets.

Particular preference is given to polycondensates in which the molar ratio of aldehyde to amino group and, respectively, carbamide group optionally to some extent substituted with organic moieties is in the range from 0.3:1 to 1:1, preferably from 0.3:1 to 0.6:1, particularly preferably from 0.3:1 to 0.55:1, very particularly preferably from 0.3:1 to 0.5:1. If the aminoplastics are used in combination with isocyanates, the molar ratio of aldehyde to amino group and, respectively, carbamide group optionally to some extent substituted with organic moieties is in the range from 0.3:1 to 1:1, preferably from 0.3:1 to 0.6:1, particularly preferably from 0.3:1 to 0.45:1, very particularly preferably from 0.3:1 to 0.4:1.

The aminoplastic resins mentioned are usually used in liquid form, usually in the form of from 25 to 90% by weight solution, preferably in the form of from 50 to 70% by weight solution, preferably in the form of aqueous solution, but they can also be used in solid form.

The solids content of the liquid aqueous aminoplastic resin can be determined by the method described in Günter Zeppenfeld, Dirk Grunwald, Klebstoffe in der Holz-und Möbelindustrie [Adhesives in the wood and furniture industry], $2^{nd}$ edn., DRW—Verlag, p. 268.

The constituents of the binder of component C) and of the binder of component H) can be used per se alone, i.e. by way of example aminoplastic resin or organic isocyanate as single constituent of the binder of component C) or of the binder of component H). However, the resin constituents of the binder of component C) and, respectively, of the binder of component H) can also be used in the form of a combination of two or more constituents of the binder of component C) and, respectively, of the binder of component H). In a preferred embodiment, the core uses, as component C), and the outer layers use, as component H), respectively an aminoplastic resin or a combination of a plurality of aminoplastic resins. In a particularly preferred embodiment, the core uses, as component C), a combination of one or more aminoplastic resins and isocyanate, and the outer layers use, as component H), an aminoplastic resin or a combination of a plurality of aminoplastic resins.

The total quantity of the binder of component C), based on the dry mass of the lignocellulose particles A) in the mixture for the core, is in the range from 1 to 15% by weight, preferably from 2 to 12% by weight, particularly preferably from 3 to 10% by weight.

If the constituents of the binder of component C) are selected only from the group of the aminoplastic resins, the total quantity of the binder of component C), based on the dry mass of the lignocellulose particles A) in the mixture for the core, is in the range from 5 to 15% by weight, preferably from 6 to 12% by weight, particularly preferably from 7 to 10% by weight.

If the constituents of the binder of component C) are selected only from the group of the isocyanates, the total quantity of the binder of component C), based on the dry mass of the lignocellulose particles A) in the mixture for the core, is in the range from 1 to 6% by weight, preferably from 2 to 5% by weight, particularly preferably from 3 to 4% by weight.

If the constituents of the binder of component C) are selected from the group of the aminoplastic resins and from the group of the isocyanates (i.e. combinations of aminoplastic resin and isocyanate being used), the total quantity of the binder of component C), based on the dry mass of the lignocellulose particles A) in the mixture for the core is in the range of from 4 to 15% by weight, preferably from 5 to 12% by weight, particularly preferably from 6 to 10% by weight. In this case the total quantity of the isocyanate in the binder of component C), based on the dry mass of the lignocellulose particles A), is in the range from 0.05 to 3.5% by weight, preferably from 0.1 to 2% by weight, particularly preferably from 0.3 to 1% by weight.

The total quantity of the binder of component H), based on the dry mass of the lignocellulose particles G) in the mixture(s) for the outer layer(s), is in the range from 1 to 15% by weight, preferably from 2 to 14% by weight, particularly preferably from 3 to 12% by weight.

If the constituents of the binder of component H) are selected only from the group of the aminoplastic resins, the total quantity of the binder of component H), based on the dry mass of the lignocellulose particles G) in the mixture(s) for the outer layer(s), is in the range from 6 to 15% by weight, preferably from 7 to 14% by weight, particularly preferably from 8 to 12% by weight.

If the constituents of the binder of component H) are selected only from the group of the isocyanates, the total quantity of the binder of component H), based on the dry mass of the lignocellulose particles G) in the mixture(s) for the outer layer(s), is in the range from 1 to 6% by weight, preferably from 2 to 5% by weight, particularly preferably from 3 to 4% by weight.

If the constituents of the binder of component H) are selected from the group of the aminoplastic resins and from the group of the isocyanates (i.e. combinations of aminoplastic resin and isocyanate being used), the total quantity of the binder of component H), based on the dry mass of the lignocellulose particles G) in the mixture(s) for the outer layer(s) is in the range of from 5 to 15% by weight, preferably from 6 to 14% by weight, particularly preferably from 7 to 12% by weight. In this case the total quantity of the isocyanate in the binder of component H), based on the dry mass of the lignocellulose particles G), is in the range from 0.05 to 3.5% by weight, preferably from 0.1 to 2% by weight, particularly preferably from 0.3 to 1% by weight.

Component D) and I)

Components D) and I) used are respectively mutually independently different or identical, preferably identical, ammonium salts known to the person skilled in the art or a mixture of these. It is preferable that these ammonium salts are added to the binder component C) and, respectively, to component H) before they are brought into contact with the lignocellulose particles A) and, respectively, G).

Examples of suitable ammonium salts are ammonium chloride, ammonium hydrogensulfate, ammonium sulfate and ammonium nitrate. It is preferable to use ammonium sulfate or ammonium nitrate, particularly preferably ammonium nitrate.

Quantities used of component D) are from 0 to 3% by weight, preferably from 0 to 2% by weight, particularly preferably from 0 to 1.5% by weight.

Quantities used of component I) are from 0 to 2% by weight, preferably from 0 to 1% by weight, particularly preferably from 0 to 0.5% by weight. In a very particularly preferred variant, no component I) is used.

If component C) comprises one or more binders from the group of the aminoplastic resins, it is then preferable that the quantity used of component D) is from 0.1 to 3% by weight, particularly from 0.3 to 2% by weight, particularly from 0.5 to 1.5% by weight.

Component E) and J)

Components E) and, respectively, J) can comprise further additives that are commercially available and known to the person skilled in the art as component E) and, respectively, component J) mutually independently quantities of from 0 to 5% by weight, preferably from 0 to 3% by weight, particularly preferably from 0 to 1.5% by weight, of identical or different, preferably identical additives, with the proviso that these components do not comply with the definitions of any of the other components A), B), C), D), F), G), H), I) or K), examples being hydrophobizing agents such as paraffin emulsions, additional hardeners, pigments, for example carbon black, antifungal agents, and formaldehyde scavengers, for example urea or polyamines.

The expression "additional hardeners" (i.e. hardeners used in addition to the ammonium salts of components D) and I)) here means any of the chemical compounds of any molecular weight which bring about or accelerate the polycondensation of aminoplastic resin. A very suitable group of additional hardeners for aminoplastic resin is that of organic and inorganic acids, for example sulfuric acid, formic acid, maleic acid, and of acid-generating substances, for example aluminum chloride, aluminum sulfate and mixtures of these. If additional hardeners are used, the proportion by weight in % by weight, based on the lignocellulose particles A) and, respectively, G) is greater in the core than in the outer layers.

Component F) and K)

Component F) and component K) can be selected mutually independently from the group of the alkali metal salts or alkaline earth metal salts from the group of the sulfates, nitrates, halides and mixtures of these. The mixtures for the core comprise, as component F), from 0.1 to 3% by weight, preferably from 0.2 to 2.5% by weight, particularly preferably from 0.25 to 2% by weight, of alkali metal salts or alkaline earth metal salts from the group of the sulfates, nitrates, halides and mixtures of these. The mixtures for the outer layers comprise, as component K), from 0 to 2% by weight, preferably from 0 to 0.15% by weight, particularly preferably from 0 to 0.05% by weight, of alkali metal salts or alkaline earth metal salts from the group of the sulfates, nitrates, halides and mixtures of these. It is very particularly preferable that no alkali metal salts or alkaline earth metal salts from the group of the sulfates, nitrates, halides and mixtures of these are added to the mixtures for the outer layers.

Examples of suitable alkali metal salts or alkaline earth metal salts from the group of the sulfates, nitrates or halides are lithium sulfate, lithium hydrogensulfate, lithium nitrate, lithium chloride, lithium bromide, sodium sulfate, sodium hydrogensulfate, sodium nitrate, sodium chloride, sodium bromide, potassium sulfate, potassium hydrogensulfate, potassium nitrate, potassium chloride, potassium bromide, magnesium sulfate, magnesium hydrogensulfate, magnesium nitrate, magnesium chloride, magnesium bromide, calcium sulfate, calcium hydrogensulfate, calcium nitrate, calcium chloride, calcium bromide or their mixtures, preferably lithium sulfate, lithium nitrate, lithium chloride, sodium sulfate, sodium nitrate, sodium chloride, potassium sulfate, potassium nitrate, potassium chloride and mixtures of these, particularly preferably lithium sulfate, lithium nitrate, sodium sulfate, sodium nitrate, potassium sulfate, potassium nitrate and mixtures of these, in particular sodium sulfate, sodium nitrate and mixtures of these, very particularly preferably sodium nitrate.

The alkali metal salts or alkaline earth metal salts from the group of the sulfates, nitrates and halides are generally used in the form of solution or powder, preferably in the form of solution. In another particular embodiment, the salts are mixed with the binder if the binder is an aqueous binder, e.g. aminoplastic resin. This can be achieved by addition of salt solution or solid, e.g. in the form of salt powder or salt granulate, particular preference being given to solid, and then mixing.

Use:

The total thickness of the multilayer lignocellulose materials of the invention varies with the application sector and is generally in the range from 0.5 to 100 mm, preferably in the range from 10 to 40 mm, in particular from 15 to 20 mm.

The average overall density of the multilayer lignocellulose materials of the invention is generally from 300 to 700 kg/m$^3$, preferably from 325 to 590 kg/m$^3$, particularly preferably from 350 to 570 kg/m$^3$, in particular from 400 to 550 kg/m$^3$. The density is determined 24 hours after production in accordance with EN 1058.

The multilayer lignocellulose materials of the invention generally have inhomogeneous density distribution perpendicularly to the plane of the board. Density in the outer layers is advantageously higher than in the core. The density profile of a board can be determined by way of absorption of incident X-ray radiation, for example by using DAX 5000 density profile measurement equipment from Grecon. The difference between density maximum in the outer layers and density minimum in the core is at least 50 kg/m$^3$, preferably from 50 to 600 kg/m$^3$, particularly preferably from 200 to 600 kg/m$^3$, in particular from 300 to 600 kg/m$^3$.

The lignocellulose materials produced by the process of the invention, in particular three-layer particle board, is used mainly in the construction industry, in the fitting-out of interiors, in shopfitting and construction of exhibition stands, as material for furniture and as packaging material.

In the construction industry, in the fitting-out of interiors and in shopfitting and construction of exhibition stands, the lignocellulose material produced in the invention is used by way of example as roof paneling and wall paneling, infill, shuttering, floors, door inlays, partitioning or shelving.

In furniture construction, the lignocellulose material produced in the invention is used by way of example as support material for unit furniture, as shelving, as door material, as worktop, as kitchen front, as outer layers in sandwich structures, or as elements in tables, chairs, and upholstered furniture.

EXAMPLES

Mixture 1

402 g of Kaurit® 347 glue (BASF SE, solids content 67%) were mixed with 50.1 g of HydroWax® 140 (Sasol, solids content 60%) and 72.0 g of water, with stirring. This mixture was added to 3123 g of sprucewood particles in a paddle mixer, and mixed.

Mixture 2

402 g of Kaurit® 347 glue (BASF SE, solids content 67%) were mixed with 20.1 g of sodium nitrate, 20.4 g of 40% ammonium nitrate solution, 50.1 g of HydroWax® 140 (Sasol, solids content 60%) and 65.4 g of water, with stirring. This mixture was added to 3123 g of sprucewood particles in a paddle mixer, and mixed.

Determination of Dielectric Loss

Dielectric loss was determined on both mixtures. For this, the respective mixture was charged to a test chamber composed of an exterior and interior metal cylinder. The structure corresponds to that of a cylindrical capacitor where the basal surfaces of the exterior and the interior cylinder lie in the same plane and the two cylindrical surfaces (internal side of the exterior cylinder and external side of the interior cylinder) are coaxial. The mixture to be tested is charged to the annular intervening space between the exterior (inside diameter 9.5 cm) and interior (diameter 5 cm) metal cylinder. The material is charged to a height of 11.9 cm. An alternating electrical field is applied to the cylindrical capacitor and the dielectric response at various frequencies (1 kHz, 10 kHz, 100 kHz, 1 MHz, 10 MHz) is determined by measuring the current flowing through the mixture of materials. An HP 4192A LF impedance analyzer from Hewlett-Packard was used for this purpose. Dielectric loss ε" was determined by extrapolation as 27.12 MHz for both mixtures.

ε" (mixture 1)=0.0134

ε" (mixture 2)=0.0230

Particle Board of the Invention

A mat made of three layers was scattered into a scattering frame (46×44 cm), the ratio of the undermost layer (outer layer) made of mixture 1, the middle layer (core) made of mixture 2 and the upper layer (outer layer) made of mixture 1 being 33:34:33 (total weight of mat: 2893 g). The scattered mat was precompacted at room temperature for 60 seconds in the scattering frame at a specific pressure of 10 bar in a down-stroke press. Using a 125 mm mat here (depth after scattering), outgoing compacted depth was 60 mm. The scattering frame was then removed. For monitoring of the temperature profile in the middle of the sheet and in the middle of the outer layers, optical sensors were introduced into the edge of the mat, respectively into a horizontal hole in the center of the outer layers and of the core. Nonwoven separators were then provided to the upper and lower side of the mat, and this was compacted to 20 mm in a HLOP 170 press from Hoefer Presstechnik GmbH within a period of 2 s, and then heated by applying a high-frequency alternating field (27.12 MHz). The press was opened once a temperature of 130° C. had been reached in the core. Said opening took place 105 seconds after application of the high-frequency alternating field. The temperature in the outer layers at this juncture was 118° C. An automatic transfer system was used to move the mat into a heated press from Höfer, where it was pressed to a thickness of 19 mm at a temperature of 220° C. (press time 152 s).

The transverse tensile strength of the resultant three-layer particle board in accordance with EN 319 was 0.98 N/mm$^2$, with a density measured (EN 1058) as 675 kg/m$^3$.

Reference Particle Board

A mat made of three layers was scattered into a scattering frame (46×44 cm), the ratio of the undermost layer (outer layer) made of mixture 1, the middle layer (core) made of mixture 1 and the upper layer (outer layer) made of mixture 1 being 33:34:33 (total weight of mat: 2884 g). The scattered mat was precompacted at room temperature for 60 seconds in the scattering frame at a specific pressure of 10 bar in a down-stroke press. Using a 125 mm mat here (depth after scattering), outgoing compacted depth was 60 mm. The scattering frame was then removed. For monitoring of the temperature profile in the middle of the sheet and in the middle of the outer layers, optical sensors were introduced into the edge of the mat, respectively into a horizontal hole in the center of the outer layers and of the core. Nonwoven separators were then provided to the upper and lower side of the mat, and this was compacted to 20 mm in a HLOP 170 press from Hoefer Presstechnik GmbH within a period of 2 s, and then heated by applying a high-frequency alternating field (27.12 MHz). The press was opened after 105 seconds. At this juncture the temperature in the core and in the outer layers was 130° C. An automatic transfer system was used to move the mat into a heated press from Höfer, where it was pressed to a thickness of 19 mm at a temperature of 220° C. (press time 152 s).

The transverse tensile strength of the resultant three-layer particle board in accordance with EN 319 was 0.81 N/mm$^2$, with a density measured (EN 1058) as 668 kg/m$^3$.

What is claimed is:

1. A multilayer lignocellulose material with a core and with at least one upper and one lower outer layer, where the core comprises the following components A) lignocellulose particles A) {component A)}, B) from 0 to 25% by weight of expanded plastics particles with bulk density in the range from 10 to 150 kg/m$^3$ {component B)}, C) from 1 to 15% by weight of one or more binders selected from the group consisting of aminoplastic resin and organic isocyanate having at least two isocyanate groups {component C)}, D) from 0 to 3% by weight of ammonium salts {component D)}, E) from 0 to 5% by weight of additives {component E)} and F) from 0.1 to 3% by weight of alkali metal salts or alkaline earth metal salts selected from the group consisting of the nitrates, halides and mixtures of these {component F)}, wherein the amounts of components B through F are based on 100 wt. % of the lignocellulose particles A) and where the outer layers comprise the following components: G) lignocellulose particles G) {component G)}, H) from 1 to 15% by weight of one or more binders selected from the group consisting of aminoplastic resin and organic isocyanate having at least two isocyanate groups {component H)}, I) from 0 to 2% by weight of ammonium salts {component I)}, J) from 0 to 5% by weight of additives {component J)} and K) from 0 to 2% by weight of alkali metal salts or alkaline earth metal salts selected from the group consisting of the sulfates, nitrates, halides and mixtures of these {component K)}, wherein the amounts of components H through K are based on 100 wt. % of the lignocellulose particles G) and the following conditions are met: component F)≥1.1*component K) and {component F)+component D)}≥{component K)+component I)}.

2. The multilayer lignocellulose material according to claim 1, wherein the multilayer lignocellulose material comprises, in the core, from 0.2 to 2.5% by weight of component F).

3. The multilayer lignocellulose material according to claim 1, wherein the multilayer lignocellulose material comprises, in the core, from 0.25 to 2% by weight of component F).

4. The multilayer lignocellulose material with a core and with at least one upper and one lower outer layer according to claim 1, wherein the total thickness of said material is from 0.5 to 100 mm.

5. The multilayer lignocellulose material with a core and with at least one upper and one lower outer layer according to claim 1, wherein the average density of said material is from 300 to 700 kg/m$^3$.

6. The multilayer lignocellulose material according to claim 5, wherein the multilayer lignocellulose material comprises, in the core, from 0.2 to 2.5% by weight of component F).

7. The multilayer lignocellulose material according to claim 5, wherein the multilayer lignocellulose material comprises, in the core, from 0.25 to 2% by weight of component F).

8. The multilayer lignocellulose material according to claim 1, wherein the difference between density maximum in the outer layers and density minimum in the core is at least 50 kg/m$^3$.

9. The multilayer lignocellulose material according to claim 1, wherein the outer layers do not contain any components K).

10. A material for furniture or as packaging material which comprises the multilayer lignocellulose material according to claim 1.

11. A roof paneling or wall paneling, infill, shuttering, floors, door inlays, partitions or shelving or as support material for unit furniture, as door material, as worktop, as kitchen front, as outer layers in sandwich structures, or as elements in tables, chairs, and upholstered furniture which comprises the multilayer lignocellulose material according to claim 1.

* * * * *